United States Patent [19]

Suzuki

[11] Patent Number: 4,884,142
[45] Date of Patent: Nov. 28, 1989

[54] ELECTRONIC CAMERA HAVING SOLID STATE IMAGE SENSOR WITH IMPROVED NOISE SIGNAL DRAINING

[75] Inventor: Nobuo Suzuki, Yokohama, Japan
[73] Assignee: Kabushiki Kaisha Toshiba, Kawasaki, Japan
[21] Appl. No.: 113,063
[22] Filed: Oct. 27, 1987
[30] Foreign Application Priority Data
Oct. 28, 1986 [JP] Japan .................. 61-256361
[51] Int. Cl.$^4$ .................................. H04N 3/14
[52] U.S. Cl. ........................ 358/213.19; 357/24
[58] Field of Search ........... 358/213.19, 213.13, 358/909; 357/24 LR

[56] References Cited

U.S. PATENT DOCUMENTS

| | | | |
|---|---|---|---|
| 3,931,463 | 1/1976 | Levine | 358/213.19 |
| 4,245,164 | 1/1981 | Funahashi | 357/24 LR |
| 4,302,779 | 11/1981 | Inoue | 358/213.19 |
| 4,322,753 | 3/1982 | Ishihara | 358/213.19 |
| 4,577,115 | 3/1986 | Rentsch et al. | 358/213.13 |

OTHER PUBLICATIONS

K. Horii, et al., "A New Configuration of CCD Imager with a Very Low Smear Level–FIT–CCD Imager," IEEE Transactions of Electron Devices, vol. ED-31, No. 7, Jul. 1984, pp. 904–909.

*Primary Examiner*—Jin F. Ng
*Assistant Examiner*—Stephen Brinich
*Attorney, Agent, or Firm*—Foley & Lardner, Schwartz, Jeffery, Schwaab, Mack, Blumenthal & Evans

[57] ABSTRACT

An electronic still camera without provision of a mechanical shutter is provided. This electronic still camera includes a solid state image sensor and a control unit therefor. This solid state image sensor comprises photosensitive units having a plurality of photosensitive pixels, a transfer unit for reading and transferring signal charges or unnecessary charges generated in the photosensitive pixels, an accumulation unit for temporarily accumulating the signal charges transferred by the transfer unit, draining means for draining the unnecessary charges transferred by the transfer unit, and taking-out means for taking out the signal charges accumulated in the accumulation unit. Thus, at the beginning of the exposure time, the control unit controls the solid state image sensor so as to read and transfer the unnecessary charges by the transfer unit to drain them by the draining means. Further, at the end of the exposure time, the control unit controls the solid state image sensor so as to read and transfer signal charges generated during the exposure time to accumulate them into the accumulation unit, thus to take out the signal charges accumulated as a pictorial image. The pictorial image thus taken out is recorded in the recording unit of the electronic still camera.

15 Claims, 4 Drawing Sheets

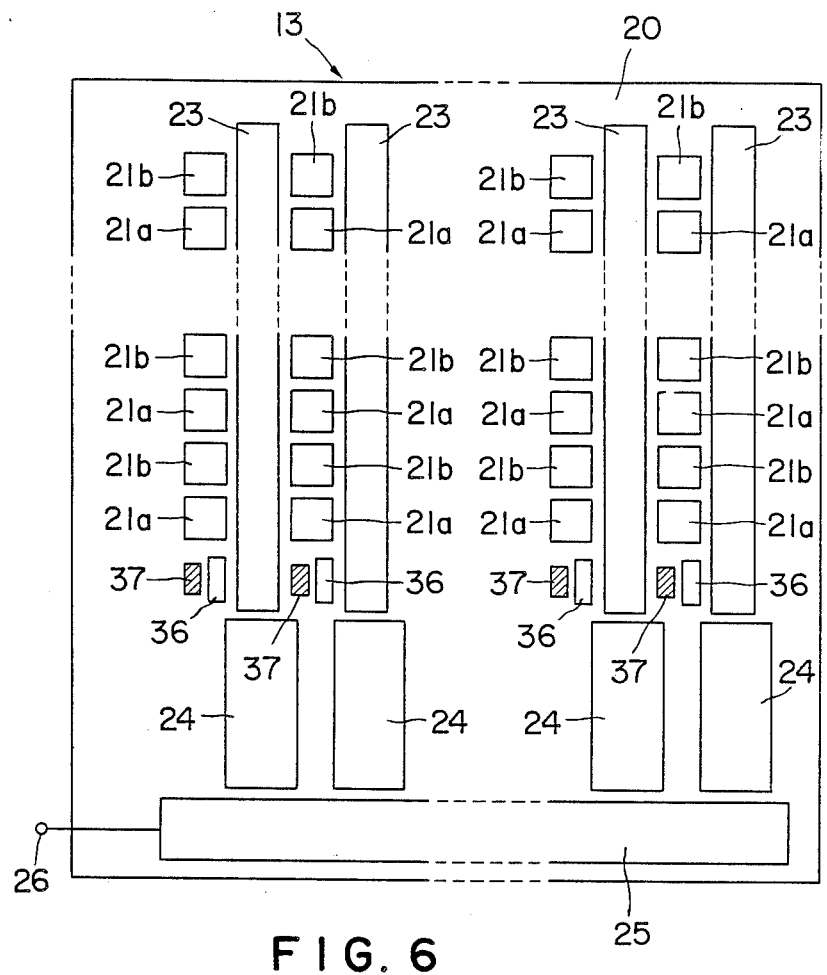
F I G. 6
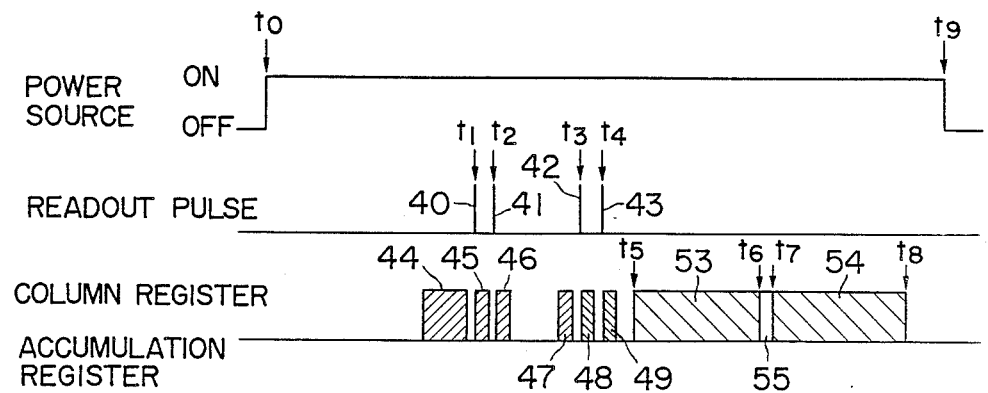
F I G. 7

ELECTRONIC CAMERA HAVING SOLID STATE IMAGE SENSOR WITH IMPROVED NOISE SIGNAL DRAINING

BACKGROUND OF THE INVENTION

The present invention relates to an electronic still camera to photograph an optical image of an object using a solid state image sensor.

Differently from optical cameras, electronic still cameras function to receive a still picture of an object by a solid state image sensor to electrically record the still picture.

A conventional electronic camera is shown in FIG. 1. In this electronic camera, when a release switch 8 is turned on for the purpose of photographing an image of an object, a power source (not shown) is turned on. Thus, a solid state image sensor 3, a signal processing unit 4, a recording unit 5, a drive circuit 6, and a control unit 7 are brought into operational condition. A light from the object is converged by a lens 1 in a manner that its optical image is formed on the solid state image sensor 3. A mechanical shutter 2 is opened by an exposure time Tint set in advance at an exposure time setting unit 9. Thus, a pictorial image signal corresponding to the optical image of the object is output to the signal processing unit 4 through the solid state image sensor 3. This pictorial image signal is recorded on a photosensitive recording medium by the recording unit 5.

As just described above, such a conventional electronic still camera employs a mechanical shutter in order to adjust a quantity of light to the solid state image sensor. However, the problem therewith is that the mechanical shutter is expensive because of high precision mechanical parts. In addition, with such a mechanical shutter, an actual exposure time has a large error with respect to the set value. For this reason, when an electronic still camera having a narrow allowed range with respect to exposure time is employed, there occurs the problem that picture quality is degraded because of error of the mechanical shutter.

SUMMARY OF THE INVENTION

The present invention has been made in consideration of the above and its object is to provide an electronic still camera which is accurate in the exposure time, which can obtain good picture quality, and which can be made up at a low cost without using a mechanical shutter.

The above-mentioned object is achieved by an electronic still camera including: an optical system for forming an optical image of an object; a solid state image sensor comprising photosensitive units having a plurality of photosensitive pixels which generate a charge corresponding to the optical image, a transfer unit for reading a signal charge or charges, or an unnecessary charge or charges generated in the photosensitive pixels to transfer them, an accumulation unit for temporarily accumulating the signal charges transferred by the transfer unit, draining means for draining the unnecessary charges transferred by the transfer unit, and taking-out means for taking out the signal charges accumulated in the accumulation unit as an image signal; control means for controlling the solid state image sensor so that at the beginning of the exposure time, it reads and transfers the unnecessary charges which have been generated in the photosensitive pixels by the transfer unit to drain them by the draining means, and at the end of the exposure time, it reads and transfers the signal charges generated in the photosensitive pixels during the exposure time to accumulate them into the accumulation unit, thus to take out the signal charges accumulated in the accumulation unit as a pictorial image signal; and recording means for recording the image signal from the solid state image sensor.

BRIEF DESCRIPTION OF THE DRAWINGS

FIG. 6 is a plan view illustrating the configuration of a solid state image sensor provided in the electronic still camera of a second embodiment according to the present invention; and FIG. 7 is a timing chart showing the operation of the electronic still camera of the second embodiment according to the present invention.

DETAILED DESCRIPTION OF THE INVENTION

Figure 1:
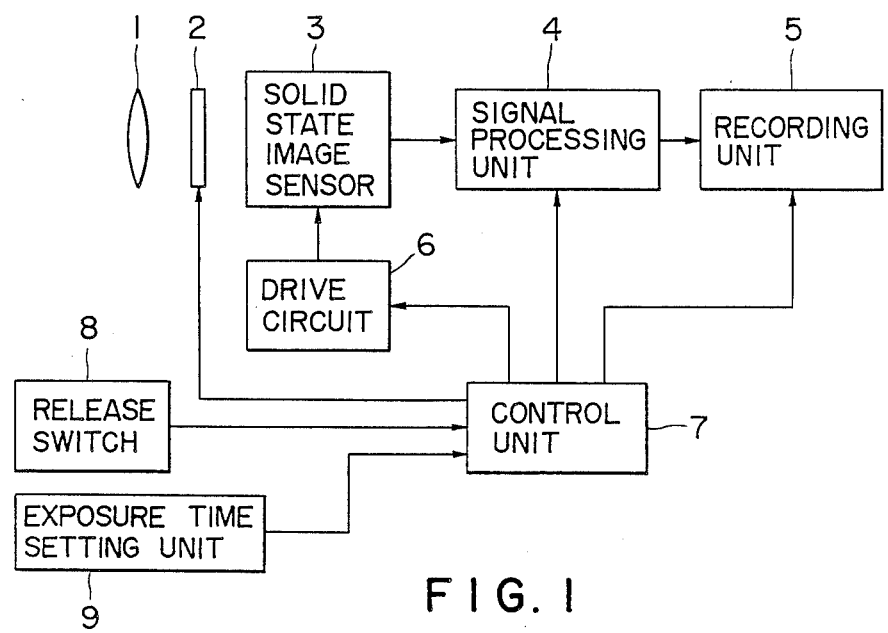
FIG. 1 is a block diagram illustrating the entire arrangement of a conventional electronic still camera.
Figure 2:
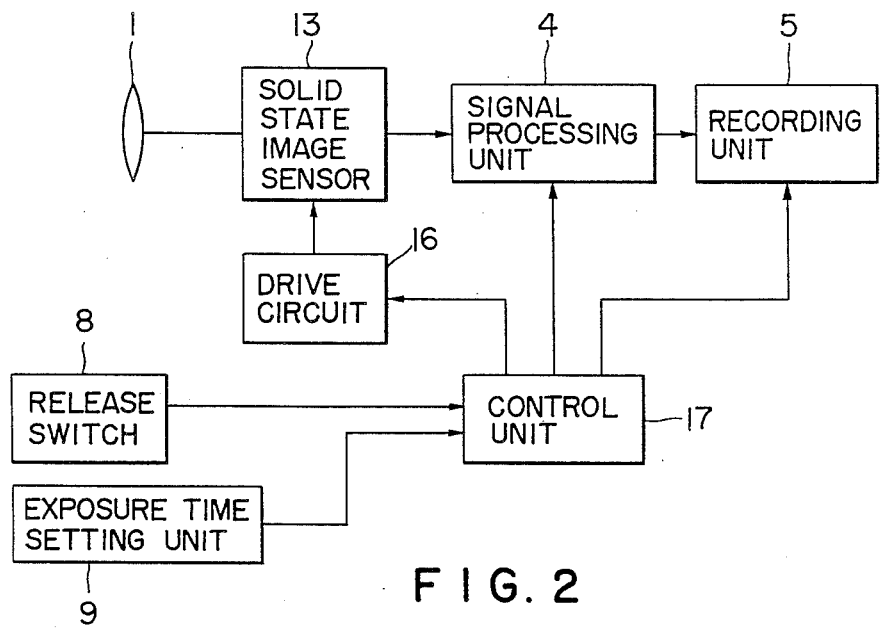
FIG. 2 is a block diagram illustrating the entire arrangement of an electronic still camera of a first embodiment according to the present invention.
Figure 3:
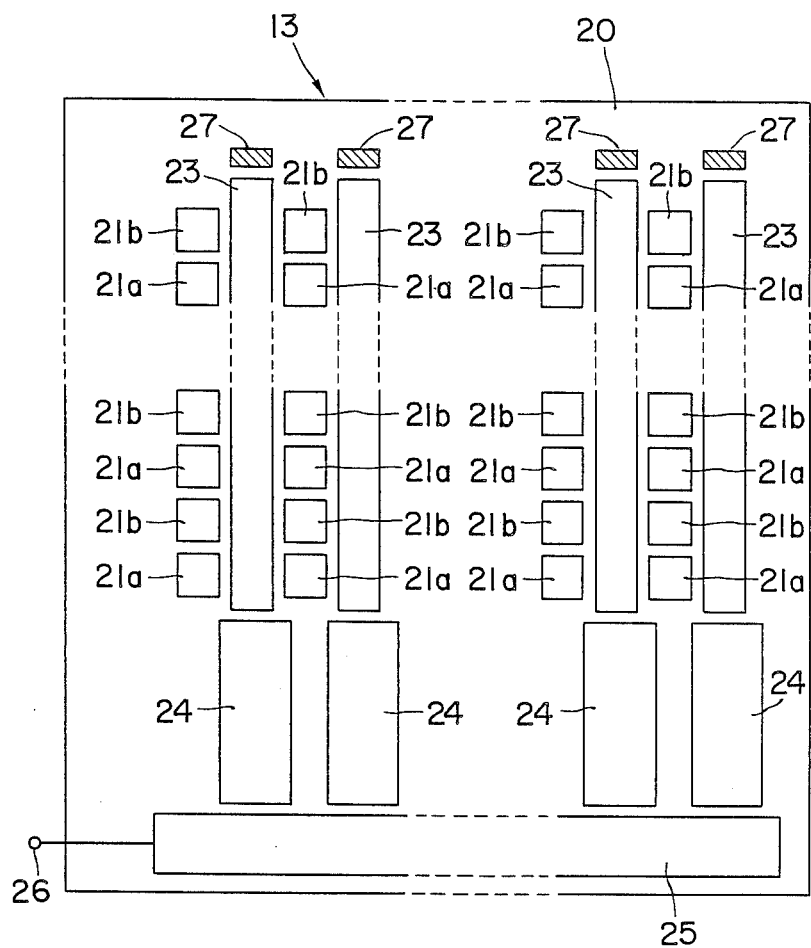
FIG. 3 is a plan view illustrating the configuration of a solid state image sensor provided in the electronic still camera shown in FIG. 2.
Figure 4:
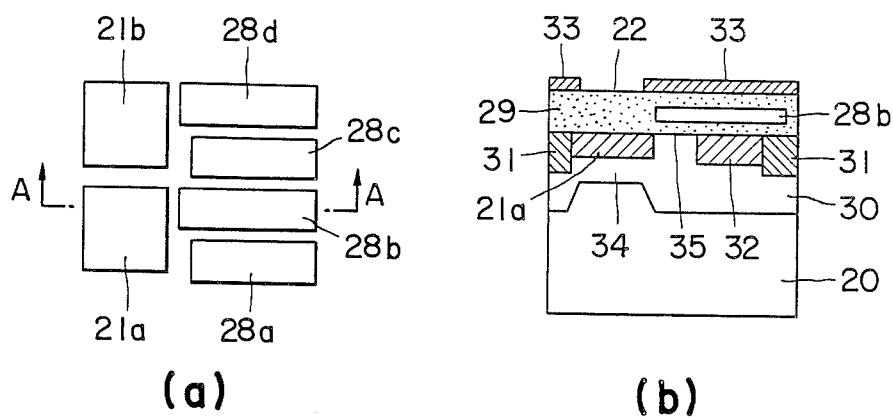
FIGS. 4(a) and 4(b) are a plan view and a cross sectional view showing the detail of a portion of the solid state image sensor shown in FIG. 3, respectively.

The entire arrangement of an electronic still camera of a first embodiment according to the present invention is shown in FIG. 2. Further, the detailed configuration of a solid state image sensor provided in this electronic still camera is shown in FIGS. 3 and 4.

A lens 1 converges a light from an object to form an optical image of the subject on a photosensitive surface of a solid state image sensor 13. A release switch 8 is manipulated by an operator, thus to activate this electronic still camera in order to photograph the image of the object. An exposure time is set in advance by an exposure setting unit 9. The solid state image sensor 13 is controlled by a drive circuit 16 only for a period of the above exposure time so as to accumulate signal charges generated to thereby change the accumulated signal charges to an electronic pictorial image signal corresponding to an optical image formed. A signal processing unit 4 processes the pictorial image signal from the solid state image sensor 13 to output the pictorial image signal processed to a recording unit 5. The recording unit 5 records the pictorial image signal processed by the signal processing unit 4. For recording method, there is known, e.g., a method to record such a pictorial image signal on a magnetic or optical recording medium. A control unit 17 controls the drive circuit 16, the solid state image sensor 13, the signal processing unit 4 and the recording unit 5 on the basis of signals from the release switch 8 and the exposure time setting unit 9.

The solid state image sensor 13 in this embodiment is formed on an n-type semiconductor substrate 20. As shown in FIG. 3, this sensor 13 is provided with photosensitive pixels having 2N rows and M columns. These photosensitive pixels 21 are classified into photosensitive pixels 21a of a first field and photosensitive pixels 21b of a second field. The photosensitive pixels 21a of the first field and the photosensitive pixels 21b of the second field are arranged alternately in a column direction as shown in FIG. 3. Namely, these photosensitive pixels 21a and 21b of the first and second fields correspond to odd and even fields, respectively.

Adjacent to the photosensitive pixels 21, M column registers 23 constituted with a four-phase CCD are provided, respectively. Each column register 23 transfers signal charges generated in the photosensitive pixels 21a and 21b. In association with the column registers 23, M accumulation registers 24 constituted with a four-phase drive CCD are provided, respectively. These accumulation registers 24 accumulate signal charges transferred from the column registers 23 and transfer those signal charges according to need. A row register 25 functions to transfer signal charges in a row direction which is vertical to the transfer direction of the column registers 23 and the accumulation registers 24. It receives charges from the M accumulation registers 24 to transfer them. On the side opposite to the accumulation registers 24 of the column registers 23, drains 27 for draining unnecessary charges are provided. These drains 27 discharge unnecessary charges transferred in the column registers 23. On the output side of the row register 25, an output terminal 26 for taking out a pictorial image signal is connected. It is to be noted that components including the column registers 23, the accumulation registers 24, the row registers 25 and the drains 27 except for the photosensitive pixels 21 are shielded by shielding films 33 so that no light is incident.

The details of the photosensitive pixels 21 and the transfer electrodes 28 of the column registers 23 are shown in FIGS. 4(a) and 4(b). As shown in FIG. 4(a), two transfer electrodes 28a and 28b are arranged relative to the photosensitive pixels 21a of the first field and two transfer electrodes 28c and 28d are arranged relative to the photosensitive pixels 21b of the second field. Namely, 4N transfer electrodes 28 are provided relative to 2N photosensitive pixels 21. As shown in FIG. 4(b), the photosensitive pixel 21a and the buried channel 32 of the column register 23 are formed in an area encompassed by channel stop regions 31 of a p-type semiconductor layer 30 formed on the surface of the semiconductor substrate 20. These components 21a and 32 are both an n-type semiconductor. The p-type semiconductor layer 30 is thin below the photosensitive pixels 21. Thus, excess charges generated in the photosensitive pixel 21a are discharged to the semiconductor substrate 20 to which a high positive voltage is applied through the thin p-type semiconductor layer 34. On the buried channel 32, the transfer electrode 28b is arranged through an insulating film 29. As previously described, portions on the insulating film 29 except for an opening portion 22 are shielded by a light-shielding film 33.

The accumulation registers 24 are driven by the four-phase clock pulse independently of the column registers 23. In association with the accumulation registers 24, 8N transfer electrodes or more are provided in a column direction. Namely, each accumulation register 24 can temporarily hold 2N signal charges or more.

The operation will be now explained with reference to FIG. 5.

When the release switch 8 is turned on in order to photograph an image of an object, the power source (not shown) is turned on. Thus, the solid state image sensor 13, the signal processing unit 4, the recording unit 5, the drive circuit 16, and the control unit 17 are brought into operational condition. A light from the object is converged by the lens 1 so that its optical image is formed on the solid state image sensor 13. However, since there is the possibility that unnecessary charges remain in the accumulation registers 24 and the buried channels 32 of the column registers 23 of the solid state image sensor 13, four-phase clock pulses (backward transfer pulses) 44 and 50 for transferring such unnecessary charges to the side of the drains 27 are first applied to the column registers 23 are the accumulation registers 24. It is desirable that these backward transfer pulses 44 and 50 have at least N pulses or more.

After unnecessary charges remaining in the column registers 23 and the accumulation registers 24 are discharged by the application of the backward transfer pulses 44 and 50, a readout pulse 40 is applied at time $t_1$ to thereby read unnecessary charges accumulated in the photosensitive pixels of the first field into the column registers 23. The application of this readout pulse 40 in an actual sense is carried out by applying a positive high voltage $V_R$ to the transfer electrode 28b. Thus, a potential well is formed in the surface portion 35 of the p-type semiconductor layer 30 to transfer charges accumulated in the photosensitive pixels 21a to the buried channels 32 below the transfer electrode 28b. It is desirable that the readout pulse 40 has a pulse width of about 10 $\mu s$.

Subsequently to the reading operation of unnecessary charges by the readout pulse, a backward transfer pulse 45 is applied to the column registers 23, thus to discharge unnecessary charges having been read from the photosensitive pixels 21a to the drains 27. Since the backward transfer pulse 45 is such that high level potential VH and low level potential VL are ground and negative potentials, respectively, no potential well is formed in the surface portion 35 at the time of the backward transfer, resulting in no possibility that charges of the photosensitive pixels 21a flow into the column registers 23. Moreover, excess charges at the photosensitive pixels 21 are discharged via the p-type semiconductor layer 34 to the semiconductor substrate 20. Accordingly, while unnecessary charges are being discharged by the application of the backward pulse, there is no possibility that unnecessary charges flow into the column registers 23 from the photosensitive pixels 21. It is desirable that the number of pulses of the backward transfer pulse 45 is N' (N' > N) and its period is less than 1$\mu$.

After unnecessary charges in the photosensitive pixels 21a of the first field are discharged, a readout pulse 41 is applied at time $t_2$ to thereby read unnecessary charges accumulated in the photosensitive pixels 21b of the second field into the column register 23. Subsequently to the reading operation of unnecessary charges by the readout pulse 41, a backward transfer pulse 46 is applied to the column register 23, to thereby discharge the unnecessary charges having been read from the photosensitive pixels 21b to the drains 27.

By readout pulses 40 and 41, unnecessary charges in the photosensitive pixels 21a and 21b are cleared at times $t_1$ and $t_2$, respectively. Thus, accumulation of signal charges is initiated. Until the exposure time Tint set at the exposure time setting unit 9 elapses, accumulation of signal charges is carried out by the photosensitive pixels 21a and 21b.

The photosensitive pixels 21a of the first field will complete accumulation at time $t_3$ when the exposure time Tint has elapsed from the time $t_1$. Since there is the possibility that noise charges due to smear or dark current might occur in the column registers 23 for a time period until time $t_3$ after the application of the backward pulse 45, it is desirable to apply a backward transfer pulse 47 to the column registers 23 before the time $t_3$ to thereby discharge such noise charges to the drains 27.

After draining of noise charges, a readout pulse 42 is applied at time $t_3$ to thereby read signal charges in the photosensitive pixels 21a of the first field into the column registers 23. Subsequently, forward transfer pulses 48 and 51 are respectively applied to the column registers 23 and the accumulation registers 24 to transfer signal changes having been read out in a direction of directing to the row register 25, thus to transfer and accumulate the signal charges into the accumulation registers 24. It is to be noted that the forward transfer pulses 48 and 51 are the same as the backward transfer pulses 45, 46 and 47 except that the former pulses are 180 degrees out-of-phase with the latter pulses. Namely, it is desirable that the number of pulses of the forward transfer pulses 48 and 51 is $N'(N'>N)$ and its period is less than 1 $\mu$s.

When the transfer of signal charges in the photosensitive pixels 21a of the first field is completed, a readout pulse 43 is applied at time $t_4$ when the exposure time Tint has elapsed from the time $t_2$, thus to read signal charges in the photosensitive pixels 21b of the second field into the column registers 23. Subsequently, forward transfer pulses 49 and 52 are respectively applied to the column registers 23 and the accumulation registers 24 to thereby transfer the signal charges having been read out in a direction directing to the row register 25. Thus, signal charges of the first and second fields are transferred to the accumulation registers 24 and are accumulated thereinto.

After signal charges of the first and second fields have been accumulated into the accumulation registers 24, line shift pulses 53 and 54 and a hold pulse 55 are applied at time $t_5$. Thus, signal charges are read out from the output terminal 26 via the row register 25 at a timing conforming to the recording format of the signal processing unit 4 and the recording unit 5. This is equivalent to so called line shift operation known in the conventional interline transfer CCD. As a result, a pictorial image signal of the first field is taken out for a time period from time $t_5$ to time $t_6$ and a pictorial image signal of the second field is taken out for a time period from time $t_7$ to time $t_8$. Thus, they are processed at the signal processing unit 4 and are then recorded at the recording unit 5. The time period from time $t_6$ to time $t_7$ corresponds to the vertical blanking period and no line shift operation is conducted for this time period.

By the above-mentioned sequence of the operation, one optical image of the object concerned is recorded. At time $t_9$, the power source is cut off to complete the recording operation.

As just described above, since no mechanical shutter is used in this embodiment, the number of parts is reduced, thus making it possible to realize a low cost electronic still camera. Further, since the exposure time can be electrically set, it can be extremely precisely determined. Thus, an optimum exposure time can be set, resulting in an excellent picture quality. In addition, since it is possible to electrically determine the exposure start interval and the exposure time when a continuous shutter action is conducted, extremely precise and excellent pictorial images can be obtained.

Even in the case of a very bright object, since signal charges which will serve as a pictorial image signal is accumulated in the accumulation register positioned away from the photosensitive pixels, there is no possibility that picture quality is degraded due to an incident light. An implementation is more effective such that particularly N' as the number of pulses is set to be considerably larger than N and portions in which signal charges in the accumulation register are accumulated are away from the photosensitive pixels. When setting is made such that the pulse period of the forward transfer pulse is less than 1 $\mu$s with respect to the smear phenomenon at the time of forward transfer, the time under the influence of the smear phenomenon can be less than 250 $\mu$s (in the case of 2N=500), with the result that the degradation of picture quality hardly occurs.

In the case of the electronic still camera according to this embodiment, the readout time for a pictorial image signal of the first field and that for a pictorial image signal of the second field are not concurrent in a strict sense, but there is a difference therebetween. Namely, the time difference between times $t_1$ and $t_2$ becomes a problem. However, when setting is made such that the relationship expressed as 2N=2N'=500 holds because each pulse width of the backward and forward transfer pulses is less than 1 $\mu$s, the time difference between times $t_1$ and $t_2$ is less than 250 $\mu$s, which is virtually no problem. For example, even when the exposure time of 1 ms (shutter speed is 1/1000 sec.) is employed, there is no problem except for a case such that an object moving at an extremely high speed is photographed.

The detailed configuration of a solid state image sensor 13 of an electronic still camera implemented by a second embodiment according to the present invention is shown in FIG. 6. In this embodiment, the portion of each column register 23 on the side of the accumulation register 24 is extended and a drain 37 is provided at the extended portion through a control gate 36. By turning the control gate 36 on, it is possible to discharge unnecessary charges having been transferred by the column register 23 to the drain 37. Further, by turning the control gate 36 off, it is possible to transfer signal charges having been transferred by the column register 23 without discharging them. It is to be noted that when unnecessary charges are discharged in this embodiment, pulses applied to the column registers 23 and the accumulation registers 24 are forward transfer pulses.

The present invention is not limited to the above-mentioned embodiments, but may be modified in various manners.

Figure 5:
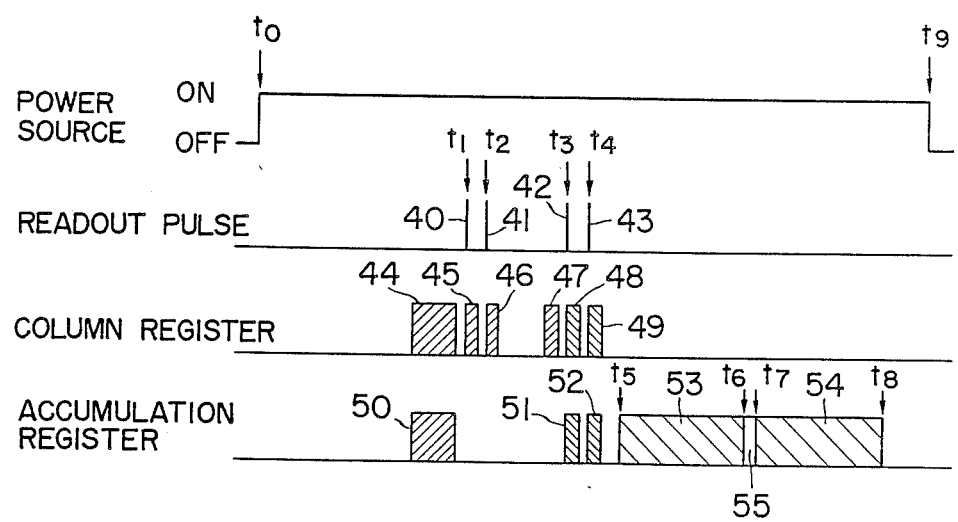
FIG. 5 is a timing chart showing the operation of the electronic still camera shown in FIG. 2.

In the above-mentioned embodiment, different pulses are applied to the column registers 23 and the accumulation registers 24 as shown in FIG. 5, but the same pulse is applied thereto as shown in FIG. 7. In this case, line shift operation pulses 53 and 54 and a hold pulse 55 are newly applied to the column registers 23. However, even if applied thereto, charges in the column registers 23 are solely transferred in sequence into the accumulation registers 24, giving rise to no problem. Further, backward transfer pulses 45, 46 and 47 (forward transfer pulses in the second embodiment) for drain of charges are newly applied to the accumulation registers 24. However, even if applied thereto, charges in the accumulation registers 24 are solely transferred in sequence within the accumulation registers 24, giving rise to no problem.

In the above-mentioned embodiments, unnecessary charges are discharged to the drains, but they may be discharged to the outside through the row register without the provision of drains.

Moreover, in case where the exposure time is short and a transfer pulse for discharging unnecessary charges of the first field and a transfer pulse for discharging unnecessary charges of the second field overlap with each other, these transfer pulses may be continuously applied.

Further, in case where noise charges produced during the exposure time of the photosensitive pixels of the first field are less, the transfer pulse immediately before signal charges in the photosensitive pixels of the field are read may be omitted.

In addition, the pictorial image signal is divided into signals of two fields, i.e., those of the first and second fields in the above-mentioned embodiments, but division of field is not necessarily required if a suitable system is employed in the signal processing unit and the recording unit.

What is claimed is:

1. A process for forming an optical image in a solid state image sensor comprising the steps of:
    (a) registering an image on photosensitive units containing pixels;
    (b) generating charges corresponding to the received image;
    (c) transferring from the photosensitive units any unnecessary charges generated in the photosensitive pixels therein;
    (d) accumulating any said charges generating in step (b);
    (e) draining any unnecessary transferred charges;
    (f) removing from the image sensor any signals accumulated in the accumulation unit just before exposure began; and
    (g) at the end of the exposure time, draining charges accumulated during the exposure time by the process of steps (a) to (f);
    wherein unnecessary charges generated in the photosensitive pixels are drained just before the beginning of the exposure period and just after the end of the exposure period.

2. An electronic camera optical system for forming an optical image of an object, comprising:
    a solid state image sensor, the sensor including photosensitive units each having a plurality of photosensitive pixels which generate charges corresponding to an optical image, each said photosensitive unit including first photosensitive pixels corresponding to a first field and second photosensitive pixels corresponding to a second field;
    means for reading the signal charges and draining unnecessary charges generated in said photosensitive pixels to transfer them; such means including first and second electrodes for the first photosensitive pixels and a third and fourth transfer electrode for said second photosensitive pixels, thereby to read charges generated in said first photosensitive pixels by said first transfer electrode and to read charges generated in said second photosensitive pixels by said third transfer electrode and to transfer the charges read by said first and fourth transfer electrodes;
    means for temporarily accumulating the signal charges transferred by said transfer means;
    means for draining the unnecessary charges transferred by said transfer means for taking out the signal charges accumulated in said accumulation unit as an image signal;
    said control means controlling said solid state image sensor so that just before the beginning of an exposure period of the first field the solid state image sensor reads and transfers unnecessary charges generated in the first photosensitive pixels by said transfer unit to drain them by said draining means, at the beginning of an exposure period of the second field the solid state image sensor reads and transfers unnecessary charges generated in said second photosensitive pixels by said transfer means to drain them by said draining means; and
    at the end of said exposure period of said first field the photosensitive means reads and transfers signal charges generated in said in said first photosensitive pixels during said exposure period of said first field to accumulate them in said accumulation means, and at the end of said exposure period of said second field, reads and transfers signal charges generated in said second photosensitive pixels during said exposure time of said second field to accumulate them in said accumulation means to take out as an image signal the signal charges of said first and second fields accumulated in said accumulation unit; and
    recording means for recording the image signal from said solid state image sensor.

3. An electronic camera optical system for forming an optical image of an object, comprising:
    a solid state image sensor, the sensor including photosensitive units, each having a plurality of photosensitive pixels which generate charges corresponding to an optical image;
    means for reading the signal and draining unnecessary charges generated in said photosensitive pixels to transfer them;
    means for temporarily accumulating the signal charges transferred by said transfer means;
    means for draining the unnecessary charges transferred by said transfer means;
    means for taking out the signal charges accumulated in said accumulation unit as an image signal;
    control means for controlling said solid state image sensor so that just before the beginning of an exposure period said solid state image sensor reads and transfers the unnecessary charges which have been generated in said photosensitive pixels to said transfer unit to drain them by said drain means before the end of said exposure period of said first field, and at the end of the exposure period, the image sensor reads and transfers the signal charges generated in said photosensitive pixels during said exposure period to accumulate them in the accumulation means, to take out the signal charges in said accumulation unit as an image signal; and
    means for recording the image signal from said solid state image sensor.

4. The electronic camera of claim 3 wherein said draining means is provided at the end portion of said transfer unit, which is opposite to said accumulation unit.

5. The electronic camera as set forth in claim 4, wherein said draining means is provided at the end portion of said transfer unit, which is opposite the said accumulation unit.

6. The electronic camera as set forth in claim 3, wherein said draining means is provided at the end portion on the side of said accumulation unit of said transfer unit.

7. An electronic camera as set forth in claim 4, wherein said draining means is provided at the end portion on the side of said accumulation unit of said transfer unit.

8. An electronic camera with improved noise signal draining, for forming an optical image of an object, comprising:
   an optical lens;
   a solid state image sensor having a photosensitive portion for generating signal charges corresponding to an optical image;
   an accumulation portion for accumulating said charges;
   a transfer portion for transferring said charges;
   a drain portion for draining unnecessary charges;
   an output portion for outputting said signal charges as image signals;
   a recorder for recording said image signals; and
   a controller for controlling said lens, sensor and recorder;
   wherein said photosensitive portion includes first photosensitive pixels corresponding to a first field and second photosensitive pixels corresponding to a second field, and said transfer portion includes a plurality of transfer electrodes, each said pixel having a plurality of electrodes corresponding to said first pixels and corresponding to said second pixels mutually transfer said charges respectively generated in the first and second pixels of said photosensitive portion; and
   wherein said controller controls said image sensor so that just before the beginning of an exposure period of the first field, unnecessary charges generated in the first pixels are read and transferred by the transfer electrodes to said drain portion at the beginning of an exposure period of the second field, unnecessary charges generated in the second pixels are read and transferred by second transfer electrodes to said drain portion; at the end of said exposure period of the first field, signal charges generated in the first pixels are read and transferred by the transfer electrodes and the charges are accumulated by said accumulation portion; and at the end of said exposure period of the second field, signal charges generated in said second pixels are read and transferred by the transfer electrodes and the charges are accumulated by said accumulation portion;
   wherein said transfer unit is provided with a first transfer electrode and a second transfer electrode for said respective first photosensitive pixels and a third transfer electrode and a fourth transfer electrode for said respective second photosensitive pixels, thereby to read charges generated in said first photosensitive pixels by said first transfer electrode and to read charges generated in said second photosensitive pixels by said third transfer electrode, and to transfer by said first and fourth transfer electrodes the charges having been read.

9. An electronic camera as set forth in claim 8, wherein said transfer electrodes comprise first electrodes which read and transfer said unnecessary charges in the first pixels, second electrodes which read and transfer said signal charges in the first pixels, third electrodes which read and transfer said unnecessary charges in the second pixels, and fourth electrodes which read and transfer said signal charges in the second pixels.

10. An electronic camera as set forth in claim 8, wherein said draining portion is provided at the end of said transfer portion, which is opposite said accumulation portion.

11. An electronic camera as set forth in claim 8, wherein said draining portion is provided at the end on the side of said accumulation portion of said transfer portion.

12. An electronic camera as set forth in claim 8, wherein said controller causes said transfer portion to transfer the unnecessary charges to the drain portion before the end of said exposure period of the first field and causes said drain portion to drain the unnecessary charges.

13. An electronic camera as set forth in claim 12, wherein said transfer portion transfer electrodes comprise first electrodes which read and transfer said unnecessary charges in the first pixels, second electrodes which read and transfer said signal charges in the first pixels, third electrodes which read and transfer said unnecessary charges in the second pixels, and fourth electrodes which read and transfer said signal charges in the second pixels.

14. An electronic camera as set forth in claim 12, wherein said drain portion is provided at the end of said transfer portion, which is opposite to said accumulation portion.

15. An electronic camera as set forth in claim 12, wherein said drain portion is provided at the end on the side of said accumulation portion of said transfer portion.

* * * * *